(12) United States Patent
Lim

(10) Patent No.: US 11,656,152 B2
(45) Date of Patent: May 23, 2023

(54) INSPECTING AND DIAGNOSING DEVICE FOR GAS TURBINE COMBUSTOR

(71) Applicant: KOREA WESTERN POWER CO., LTD., Chungcheongnam-do (KR)

(72) Inventor: Jung Sub Lim, Chungcheongnam-do (KR)

(73) Assignee: KOREA WESTERN POWER CO., LTD., Chungcheongnam-Do (KR)

( * ) Notice: Subject to any disclaimer, the term of this patent is extended or adjusted under 35 U.S.C. 154(b) by 0 days.

(21) Appl. No.: 16/846,361

(22) Filed: Apr. 12, 2020

(65) Prior Publication Data
US 2021/0140852 A1    May 13, 2021

(30) Foreign Application Priority Data
Oct. 17, 2019   (KR) .................. 10-2019-0129216

(51) Int. Cl.
*G01M 15/14* (2006.01)
(52) U.S. Cl.
CPC ................................ *G01M 15/14* (2013.01)
(58) Field of Classification Search
CPC ...................................................... G01M 15/14
See application file for complete search history.

(56) References Cited

U.S. PATENT DOCUMENTS

| | | | | |
|---|---|---|---|---|
| 3,670,479 A | * | 6/1972 | Tomlinson | B04C 3/00 55/416 |
| 6,089,822 A | * | 7/2000 | Fukuno | F01D 5/189 415/115 |
| 6,460,346 B1 | * | 10/2002 | Cleary | F02C 9/28 60/779 |
| 6,962,043 B2 | * | 11/2005 | Venkateswaran | F01D 17/085 60/39.24 |
| 10,712,286 B1 | * | 7/2020 | Fetzer | G01N 29/225 |
| 2010/0299179 A1 | * | 11/2010 | Alonso | G06Q 10/0637 280/727 |
| 2015/0025814 A1 | * | 1/2015 | Giannini | F04B 51/00 702/35 |
| 2015/0152791 A1 | * | 6/2015 | White | F23N 5/003 700/282 |
| 2015/0160096 A1 | * | 6/2015 | Patrick | G01M 15/14 702/35 |
| 2019/0019096 A1 | * | 1/2019 | Yoshida | G06N 7/005 |
| 2019/0048722 A1 | * | 2/2019 | Srinivasan | B23K 26/0093 |
| 2019/0264573 A1 | * | 8/2019 | Nagano | F02C 7/00 |
| 2020/0279367 A1 | * | 9/2020 | White | B64C 39/024 |

FOREIGN PATENT DOCUMENTS

JP          07317566 A      12/1995

* cited by examiner

*Primary Examiner* — Alexander Satanovsky
(74) *Attorney, Agent, or Firm* — Tucker Ellis LLP

(57) ABSTRACT

A device capable of automatically inspecting and diagnosing an inspection location when an abnormal situation occurs to a gas turbine combustor. In an example embodiment, an inspecting and diagnosing device capable of inspecting and diagnosing inspection locations of a plurality of combustors provided in a gas turbine, the inspecting and diagnosing device calculates as result values function values for unit devices of a power generation facility using a combustion gas flow location temperature index (X), an average combustion gas flow temperature index (Y), a gas turbine swirl angle index (Z), and a gas turbine power output index (MW).

20 Claims, 4 Drawing Sheets

| Automatic inspection location diagnosis index | Index range | Remarks |
|---|---|---|
| Combustion gas flow location temperature index (X) | 0 ~ 800 | Exhaust gas temperatures (16 locations) of gas turbine |
| Average combustion gas flow temperature index (Y) | 0 ~ 800 | Average exhaust gas temperatures of gas turbine |
| Gas turbine swirl angle index (Z) | 0 ~ 67.5 | Rotation angles of internal combustion gas of gas turbine |
| Gas turbine power output index (MW) | 0 ~ 900 | Quantity of power generated from gas turbine |

FIG. 1

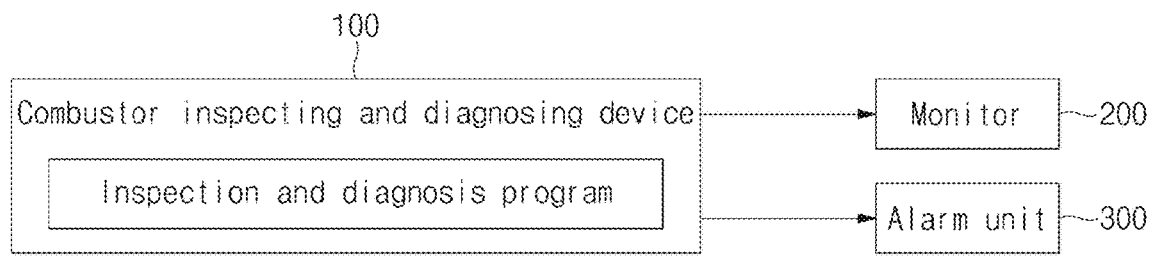

FIG. 2

| Automatic inspection location diagnosis index | Index range | Remarks |
|---|---|---|
| Combustion gas flow location temperature index (X) | 0 ~ 800 | Exhaust gas temperatures (16 locations) of gas turbine |
| Average combustion gas flow temperature index (Y) | 0 ~ 800 | Average exhaust gas temperatures of gas turbine |
| Gas turbine swirl angle index (Z) | 0 ~ 67.5 | Rotation angles of internal combustion gas of gas turbine |
| Gas turbine power output index (MW) | 0 ~ 900 | Quantity of power generated from gas turbine |

FIG. 5

| Gas turbine power output (MW) | 30 | 60 | 90 | 120 | 150 | 180 | 210 | 240 | 270 |
|---|---|---|---|---|---|---|---|---|---|
| Calculated value #1 combustor | 0.07 | 0.07 | 0.07 | 0.07 | 0.07 | 0.07 | 0.07 | 0.07 | 0.07 |
| Calculated value #2 combustor | 6.04 | 6.04 | 6.04 | 6.04 | 6.04 | 6.04 | 6.04 | 6.04 | 6.04 |
| Calculated value #3 combustor | 0.13 | 0.13 | 0.13 | 0.13 | 0.13 | 0.13 | 0.13 | 0.13 | 0.13 |
| Calculated value #4 combustor | 10.10 | 10.10 | 10.10 | 10.10 | 10.10 | 10.10 | 10.10 | 10.10 | 10.10 |
| Calculated value #5 combustor | 177.33 | 177.33 | 177.33 | 177.33 | 177.33 | 177.33 | 177.33 | 177.33 | 177.33 |
| Calculated value #6 combustor | 221.06 | 221.06 | 221.06 | 221.06 | 221.06 | 221.06 | 221.06 | 221.06 | 221.06 |
| Calculated value #7 combustor | 0.43 | 0.43 | 0.43 | 0.43 | 0.43 | 0.43 | 0.43 | 0.43 | 0.43 |
| Calculated value #8 combustor | 2.82 | 2.82 | 2.82 | 2.82 | 2.82 | 2.82 | 2.82 | 2.82 | 2.82 |
| Calculated value #9 combustor | 0.25 | 0.25 | 0.25 | 0.25 | 0.25 | 0.25 | 0.25 | 0.25 | 0.25 |
| Calculated value #10 combustor | 0.52 | 0.52 | 0.52 | 0.52 | 0.52 | 0.52 | 0.52 | 0.52 | 0.52 |
| Calculated value #11 combustor | 0.19 | 0.19 | 0.19 | 0.19 | 0.19 | 0.19 | 0.19 | 0.19 | 0.19 |
| Calculated value #12 combustor | 0.17 | 0.17 | 0.17 | 0.17 | 0.17 | 0.17 | 0.17 | 0.17 | 0.17 |
| Calculated value #13 combustor | 0.03 | 0.03 | 0.03 | 0.03 | 0.03 | 0.03 | 0.03 | 0.03 | 0.03 |
| Calculated value #14 combustor | 119.48 | 119.48 | 119.48 | 119.48 | 119.48 | 119.48 | 119.48 | 119.48 | 119.48 |
| Calculated value #15 combustor | 160.29 | 160.29 | 160.29 | 160.29 | 160.29 | 160.29 | 160.29 | 160.29 | 160.29 |
| Calculated value #16 combustor | 0.18 | 0.18 | 0.18 | 0.18 | 0.18 | 0.18 | 0.18 | 0.18 | 0.18 |

INSPECTING AND DIAGNOSING DEVICE FOR GAS TURBINE COMBUSTOR

CROSS-REFERENCE TO RELATED APPLICATION

This application claims priority to and the benefit of Korean Patent Application No. 10-2019-0129216 filed on Oct. 17, 2019 in the Korean Intellectual Property Office, the contents of which in its entirety are herein incorporated by reference.

BACKGROUND

1. Field

Aspects of embodiments of the present disclosure relate to a device capable of automatically inspecting and diagnosing an inspection location when an abnormal situation occurs to a gas turbine combustor.

2. Description of the Related Art

Recently, the potential likelihood of abnormalities of high-temperature components, such as gas turbine combustors or fuel nozzles, has been on the rise according to elevated temperatures of gas turbine combustor inlet portions. Accordingly, it is becoming technically significant to conduct ordinary maintenance activities so as to be suited to characteristics of gas turbine facilities. To date, however, inspection and maintenance activities are habitually being repeated, and frequent inspection has centered chiefly on only major core facilities.

In addition, when the gas turbine combustor is determined to be in an abnormal situation, maintenance items and inspection locations for major core facilities may be sometimes incongruently determined without objectively analyzing data for gas turbine characteristics, and it is often the case that the operational reliability of a power generation facility is lowered and a maintenance time is prolonged.

In addition, because it is quite difficult to quantitatively identify the location of a gas turbine combustor to which abnormality occurred, frequent inspection processes have been unnecessarily performed on all combustors that are presumed to be in abnormal situations, which may result in an increased maintenance time and a prolonged start-up time, thereby ultimately lowering the economic efficiency in operating the generating facility, including increased maintenance and repair costs, reduced profits, and so on.

SUMMARY

Embodiments of the present disclosure provide a device capable of automatically inspecting and diagnosing an inspection location when an abnormal situation occurs to a gas turbine combustor.

According to an aspect of the present disclosure, there is provided an inspecting and diagnosing device capable of inspecting and diagnosing inspection locations of a plurality of combustors provided in a gas turbine, the inspecting and diagnosing device calculating as result values function values for unit devices of a power generation facility using a combustion gas flow location temperature index (X), an average combustion gas flow temperature index (Y), a gas turbine swirl angle index (Z), and a gas turbine power output index (MW).

The inspecting and diagnosing device may calculate the function values using the following equation:

$$f = \frac{e^{(0.7347 \times |X-Y|)}}{[MW]} \times \frac{Z}{10} \quad (1)$$

where X represents a combustion gas flow location temperature index, Y represents an average combustion gas flow temperature index, Z represents a swirl angle index, and MW represents a power index.

The combustion gas flow location temperature index may mean a combustion gas temperature measured at an exhaust gas discharge location of the gas turbine after the exhaust gas passes through all rotary and stationary blades installed along the combustion gas flow of the gas turbine and may be measured at the rear ends of 4-stage blades of the gas turbine.

The average combustion gas flow temperature index may be measured as an average exhaust gas temperature value of the exhaust gas discharged from a plurality of combustors, and the average combustion gas flow temperature value may be a representative value for temperatures differing in a constant range for the respective combustors and may mean an average thermal distribution of the respective combustors.

The gas turbine swirl angle index may mean a combustion gas rotation angle measured on the combustion gas flow depending on the power output of the gas turbine and may be measured at the rear ends of 4-stage blades of the gas turbine.

The gas turbine power output index, which is the power produced from the gas turbine through fuel combustion, may be measured at a power production stage of the gas turbine for power generation and may correspond to one of representative quantitative numerical values indicating thermal loads or momentums of gas turbines to thus be selected as values to be compared with those calculated by the algorithm.

As described above, the inspecting and diagnosing device according to the present disclosure is capable of automatically inspecting and diagnosing an inspection location when an abnormal situation occurs to a gas turbine combustor.

BRIEF DESCRIPTION OF DRAWINGS

FIG. 1 is a schematic diagram of an inspecting and diagnosing device according to an embodiment of the present disclosure.

FIG. 2 shows a table illustrating various indexes used in obtaining gas turbine inspection locations in the inspecting and diagnosing device according to an embodiment of the present disclosure.

FIG. 5 is an example graph for explaining function values calculated at various combustors for the respective gas turbine outputs and an inspecting method therefor.

DETAILED DESCRIPTION

Figure 3:
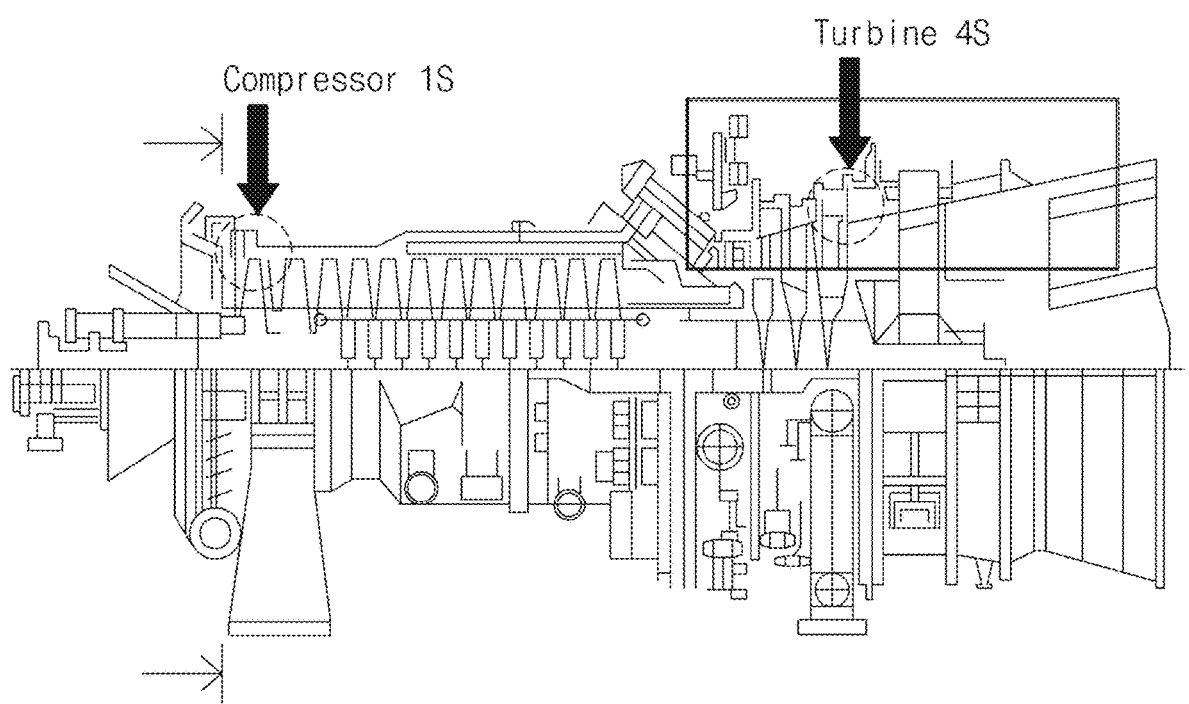
FIG. 3 shows combustion gas flow locations on which temperatures are measured in a gas turbine.

Hereinafter, a preferred embodiment of the present disclosure will be described in detail with reference to the accompanying drawings such that those can easily be embodied by those skilled in the art.

Referring to FIG. 1, a gas turbine combustor 10 according to an embodiment of the present disclosure may include a monitor 200 and an alarm unit 300, which are connected to a combustor inspecting and diagnosing device 100.

The combustor inspecting and diagnosing device 100 may include an inspection and diagnosis program embedded therein and may automatically calculate and obtain inspection results for various combustors by inputting various indexes for the combustors into an inspection and diagnosis algorithm according to the results of the inspection and diagnosis program.

To this end, as shown in FIG. 2, the combustor inspecting and diagnosing device 100 may store a combustion gas flow location temperature index (X), an average combustion gas flow temperature index (Y), a gas turbine swirl angle index (Z), and a gas turbine power output index (MW).

Here, the combustion gas flow location temperature index (X) may mean a combustion gas temperature (index) measured at an exhaust gas discharge location of the gas turbine after the exhaust gas passes through all rotary and stationary blades installed along the combustion gas flow of the gas turbine. In addition, the combustion gas flow location temperature index (X) may be in a range of temperatures measured for the exhaust gas discharged from the gas turbine, the range being between 0 and 800° C. and increasing from the atmospheric temperature to, for example, 700° C., according to the increase in the power output.

The average combustion gas flow temperature index (Y) may mean an average combustion gas temperature (index) measured at an exhaust gas discharge location of the gas turbine after the exhaust gas passes through all rotary and stationary blades installed along the combustion gas flow of the gas turbine. In addition, the average combustion gas flow temperature index (Y) may be in a range of average temperatures measured for the exhaust gas discharged from the gas turbine, the range being between 0 and 800° C. and increasing from the atmospheric temperature to, for example, 700° C., according to the increase in the power output.

The gas turbine swirl angle index (Z) may mean a combustion gas rotation angle (index) measured on the combustion gas flow depending on the power output of the gas turbine. That is to say, the combustion gas may rotate up to 67.5° according to the increase in the power output.

The gas turbine power output index (MW) may mean the power (index) generated from the gas turbine through fuel combustion. The gas turbine power index (MW) may mean the quantity of power generated from the gas turbine. For example, the optimum gas turbine may have a maximum capacity of about 330 MW.

Hereinafter, the respective indexes will be described with reference to combustion gas flow locations at combustors.

FIG. 3 shows combustion gas flow locations on which temperatures are measured in a gas turbine.

1. Combustion gas flow location temperature index (X): The exhaust gas temperature measured at a location indicated by a rectangular block superimposed on the gas turbine shown in FIG. 3.

Details of the combustion gas flow location temperature index (X) are as follows:

Index definition: The combustion gas flow location temperature index (X) is defined as a combustion gas temperature (index) is measured at each gas turbine exhaust gas discharge location after the exhaust gas passes through all rotary and stationary blades installed along the gas turbine combustion gas flow.

Measurement locations: The combustion gas temperatures are measured 75 cm away from rear ends of four-stage blades of the gas turbines (16 combustors being circumferentially installed at an angular interval of 22.5°).

Measurement method: Thermocouples of gas turbines are measured at rear ends of the gas turbines.

Reason for adopting combustion gas flow location temperature index: The extent of thermal distribution of the exhaust gas discharged from 16 gas turbine combustors can be individually identified for each combustor according to the gas turbine power output.

The thermocouples measured for the gas turbine exhaust gas exhibit very high accuracy and reliability.

The combustion gas flow location temperatures may increase from the atmospheric temperature to 800° C. (up to 650° C. with the current technology) according to the increase in the power output.

2. Average combustion gas flow temperature index (Y): The average exhaust gas temperature measured at a location indicated by the rectangular block shown in FIG. 3.

Index definition: The average combustion gas temperature (index) is defined as an average exhaust gas temperature measured at each exhaust gas discharge location of the gas turbine after the exhaust gas passes through all rotary and stationary blades installed along the combustion gas flow of the gas turbine.

Measurement method: Thermocouples of gas turbines are measured at rear ends of the gas turbines.

Measurement locations: The average combustion gas temperatures are measured 75 cm away from rear ends of four-stage blades of the gas turbines.

Reason for adopting average exhaust gas temperature index: The average value for the thermal distribution extents of the exhaust gas discharged from 16 gas turbine combustors is individually identified for each combustor according to the gas turbine power output.

The average combustion gas flow temperature value is a representative value for temperatures differing in a constant range for the respective combustors and means an average thermal distribution of the respective combustors.

Figure 4:
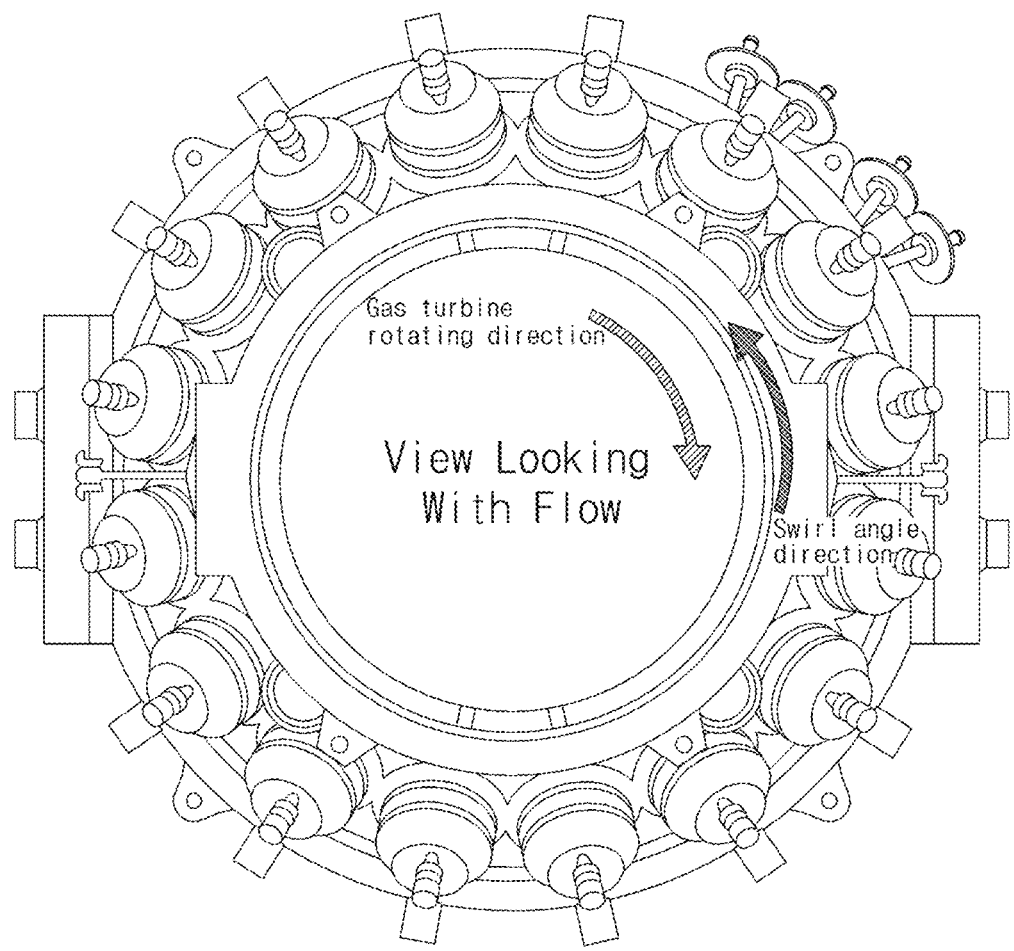
FIG. 4 shows combustion gas flow locations on which swirl angles are measured in a gas turbine.

FIG. 4 shows combustion gas flow locations on which swirl angles are measured in a gas turbine.

3. Gas turbine swirl angle index (Z): The combustion gas rotation angle (index) measured at a location indicated by the rectangular block shown in FIG. 3.

Index definition: The gas turbine swirl angle index (Z) is defined as a combustion gas rotation angle (index) measured on the combustion gas flow according to the gas turbine power output.

Measurement locations: The combustion gas rotation angles are measured 75 cm away from rear ends of four-stage blades of the gas turbines.

Reason for adopting gas turbine swirl angle index: The rotation angle of the exhaust gas discharged from 16 gas turbine combustors can be individually identified for each combustor.

The combustion gas rotates up to 67.5° according to the increase in the power output.

4. Gas Turbine Power Index (MW)

Index definition: The gas turbine power index (MW) is defined as the power (index) produced from the gas turbine through fuel combustion, is measured at a power production stage of the gas turbine for power generation.

Measurement locations: The gas turbine power is measured at a power production stage of the gas turbine for power generation.

Reason for adopting the gas turbine power index: The gas turbine power corresponds to one of representative quantitative numerical values indicating thermal loads or momentums of gas turbines to thus be selected as values to be compared with those calculated by the algorithm.

Recently developed gas turbines demonstrate a maximum capacity of about 330 MW (as of the year 2019).

An automatic inspection and diagnosis function is deduced by comprehensively analyzing operation experiences and correlations between actual degradation mechanisms and each of the indexes X, Y, Z and MW, and a function value is then obtained as a result value by inputting a corresponding index the automatic inspection and diagnosis function. If the result value is higher than a gas turbine power output at the time of calculating the result value, the automatic inspection and diagnosis function automatically calculates an inspection portion (location) of the gas turbine combustor.

Hereinafter, the algorithm for diagnosing inspection locations in the combustor inspecting and diagnosing device 100 through the indexes stated above will be described.

First, the automatic inspection and diagnosis function is expressed as follows:

$$f = \frac{e^{(0.7347 \times |X-Y|)}}{[MW]} \times \frac{Z}{10} \quad (1)$$

where X represents a combustion gas flow location temperature index, Y represents an average combustion gas flow temperature index, Z represents a swirl angle index, and MW represents a power index.

In addition, the combustor inspecting and diagnosing device 100 may automatically diagnose an inspection portion when the function value (f) of the equation 1 is greater than or equal to the gas turbine power output, and may determine that no inspection operation is required when the function value (f) is less than the gas turbine power output.

Combustors for a large-capacity gas turbine for power generation may include 14 to 16 combustors circumferentially installed at an angular interval of, for example, 22.5°, and the respective combustors may be the same with one another in view of configuration and function. Since the combustors are installed within the same gas turbine, the same environmental conditions including usable fuels, handling fluids, flow rates, temperatures, pressures, and so on, are applied to the respective combustors. A temperature difference between each of the respective combustors suggests that a physical abnormality has occurred to a particular combustor. As the temperature difference between each of the combustors is increased, the likelihood of physical abnormalities is sharply increased. The combustion gas flow location temperature index (X) and the average combustion gas flow temperature index (Y) are measured using 16 thermocouple values, and the thermocouple values are uniform for each power output in an ideal operating state.

In addition, a difference between the combustion gas flow location temperature index (X) and the average combustion gas flow temperature index (Y) may mean that the corresponding combustor is in a thermally imbalanced state. If a combustor has a lower or higher temperature index than the average index value, the combustor may be highly likely to have physical abnormality. If a combustor is in a normal state, a deviation in the combustion gas flow location temperatures (X) of the combustor is not significant and the combustor demonstrates a temperature distribution being in a constant range. However, if abnormality occurs to the gas turbine combustor, the likelihood of physical abnormality having occurred to the gas turbine combustor is significantly increased according to the increasing deviation of the combustion gas flow location temperatures (X). For this reason, the combustion gas flow location temperature index (X) and the average combustion gas flow temperature index (Y) are selected as key parameters of the inspection and diagnosis function. It is understood that a larger function value exponentially increases the probability of diagnosing abnormality from the gas turbine combustor.

Meanwhile, a difference between the combustion gas flow location temperature index (X) and the average combustion gas flow temperature index (Y) may be a primary parameter indicating combustor abnormality, but the difference therebetween, if any, may not entirely represent combustor abnormalities in all cases. In some cases, there may be a difference between the combustion gas flow location temperature index (X) and the average combustion gas flow temperature index (Y) of a combustor according to the gas turbine model, intervals between each of combustors arranged, material features, temperatures, and so on. In such cases, physical damages may be caused to 80% of combustors provided in a large-scale gas turbine for power generation. In the light of the foregoing, a constant 0.8 was selected as a default value. In the case of a large-capacity gas turbine for 1,500° C.-class power generation, the constant 0.8 was corrected to 0.7347 by comprehensively analyzing upgraded materials of combustors, array intervals and types of combustors, and damages and inspection cases of actual gas turbines for 7 years. It was confirmed that calculated values with the corrected constant 0.7347 reflected were consistent with the on-site damage cases and actual inspection results.

The calculated value expressed as an exponential function value with the difference between the combustion gas flow location temperature index (X) and the average combustion gas flow temperature index (Y) reflected on the automatic inspection and diagnosis function, is divided by the gas turbine power index (MW). The reason of the foregoing is to correct for a temperature difference or deviation depending on the power output because the difference between the combustion gas flow location temperature index (X) and the average combustion gas flow temperature index (Y) increases according to the increase in the power output, and to reflect the possibility of occurrence of combustor abnormalities on the algorithm. In addition, since the possibility of occurrence of combustor abnormalities is in proportion to the magnitude of the gas turbine swirl angle, the gas turbine swirl angle index (Z) was reflected on the automatic inspection and diagnosis function.

The automatic inspection and diagnosis function was designed such that the inspection portion is automatically diagnosed when the thus calculated function value as a comparison result value is determined to be higher than the gas turbine power output as the comparison result, and it is determined that no inspection is required when the comparison result is less than the gas turbine power output. The reason of the foregoing is as follows. Since the difference between the combustion gas flow location temperature index (X) and the average combustion gas flow temperature index (Y), and the gas turbine swirl angle index (Z) interwork in an exponentially proportion according to the gas turbine power output, representative quantitative numerical values indicating thermal loads or momentums of gas turbines were selected as reference values for determining the diagnosis result.

Hereinafter, an example of automatically diagnosing an inspection portion using a function value (f) using the above equation (1) will be described.

FIG. 5 is an example graph for explaining function values calculated at various combustors for the respective gas turbine power outputs and an inspecting method therefor. A method for automatic diagnosis will now be described with reference to FIG. 5.

(1) In the case when the gas turbine power output is less than 90 MW

In this case, a combustor in which the calculated function value (f) is greater than or equal to the gas turbine power output, and each one combustor installed before and behind the corresponding combustor, are to be inspected/replaced.

For example, the inspection/replacement operations are performed on a corresponding combustor with a calculated value of 177.33 at 30 MW, as shown in FIG. 5, and each one combustor installed before and behind the corresponding combustor.

(2) In the case when the gas turbine power output is in a range of between 90 and 180 MW In this case, a combustor in which the calculated function value (f) is greater than or equal to the gas turbine power output, and each two combustors installed before and behind the corresponding combustor, are to be inspected/replaced.

For example, the inspection/replacement operations are performed on a corresponding combustor with a calculated value of 177.33 at 120 MW and each two combustors installed before and behind the corresponding combustor.

(3) In the case when the gas turbine power output is greater than or equal to 180 MW In this case, a combustor in which the calculated function value (f) is greater than or equal to the gas turbine power output, and each three combustors installed before and behind the corresponding combustor, are to be inspected/replaced.

For example, the inspection/replacement operations are performed on a corresponding combustor with a calculated value of 221.06 at 210 MW and each three combustors installed before and behind the corresponding combustor.

While the foregoing embodiment has been described to practice the inspecting and diagnosing device of a high-temperature component of the gas turbine combustor according to the present disclosure, it will be understood by those of ordinary skill in the art that various changes in form and details may be made therein without departing from the spirit and scope of the present disclosure as defined by the following claims.

What is claimed is:

1. An inspecting and diagnosing apparatus for determining inspection locations of a plurality of combustors in a gas turbine, the inspecting and diagnosing apparatus comprising:
a plurality of temperature sensors located to measure temperature at each of plural gas turbine exhaust gas discharge locations in the gas turbine; and
an inspecting and diagnosing device operatively coupled to receive temperature data from the temperature sensors and that executes an inspection and diagnosis program that calculates a function value for each of the combustors of the gas turbine using a combustion gas flow location temperature index (X), an average combustion gas flow temperature index (Y), a gas turbine swirl angle index (Z), and a gas turbine power output index (MW);
wherein the average combustion gas flow temperature index is measured as an average exhaust gas temperature value of the exhaust gas discharged from a plurality of combustors, and the average combustion gas flow temperature value is a representative value for temperatures differing in a constant range for the respective combustors and means an average thermal distribution of the respective combustors;
wherein the function values each are based on a difference between the combustion gas flow location temperature index (X) and the average combustion gas flow temperature index (Y), and scaled by the gas turbine swirl angle index (Z);
wherein the inspection and diagnosis program automatically determines that an inspection is required for each combustor that has a function value greater than a gas turbine power output and that no inspection is required for each combustor that has a function value less than the gas turbine power output; and
wherein the inspection and diagnosis program automatically determines an inspection location of the gas turbine upon automatically determining that an inspection is required.

2. The inspecting and diagnosing apparatus of claim 1, wherein the inspecting and diagnosing device calculates the function values using the following equation:

$$f = \frac{e^{(0.7347 \times |X-Y|)}}{[MW]} \times \frac{Z}{10} \quad (1)$$

where X represents the combustion gas flow location temperature index, Y represents the average combustion gas flow temperature index, Z represents the gas turbine swirl angle index, and MW represents the gas turbine power index.

3. The inspecting and diagnosing apparatus of claim 1, wherein the combustion gas flow location temperature index means a combustion gas temperature measured with a corresponding one of the temperature sensors at an exhaust gas discharge location of the gas turbine after the exhaust gas passes through all rotary and stationary blades installed along the combustion gas flow of the gas turbine and is measured at the rear ends of 4-stage blades of the gas turbine.

4. The inspecting and diagnosing apparatus of claim 1, wherein the gas turbine swirl angle index means a combustion gas rotation angle measured on the combustion gas flow depending on the power output of the gas turbine and is measured at the rear ends of 4-stage blades of the gas turbine.

5. The inspecting and diagnosing apparatus of claim 1, wherein the gas turbine power output index, which is the power produced from the gas turbine through fuel combustion, is measured at a power production stage of the gas turbine for power generation and corresponds to one of representative quantitative numerical values indicating thermal loads or momentums of combustors to thus be selected as values to be compared with those calculated by the algorithm.

6. The inspecting and diagnosing apparatus of claim 1, wherein the function values each are based on an exponential proportion of the difference between the combustion gas flow location temperature index (X) and the average combustion gas flow temperature index (Y) to the gas turbine power output index (MW), the exponential proportion scaled by the gas turbine swirl angle index (Z).

7. The inspecting and diagnosing apparatus of claim 1, wherein the temperature sensors are located to measure temperature after exhaust gas passes through all rotary and stationary blades installed along a combustion gas flow of the gas turbine.

8. The inspecting and diagnosing apparatus of claim 7, wherein combustion gas rotation angles are measured for each combustor at a predetermined distance from rear ends of a stage of blades of the gas turbine.

9. The inspecting and diagnosing apparatus of claim 1, wherein combustion gas rotation angles are measured for each combustor at a predetermined distance from rear ends of a stage of blades of the gas turbine.

10. The inspecting and diagnosing apparatus of claim 7, wherein the temperature sensors are located at a predetermined distance from rear ends of a stage of blades of the gas turbine.

11. The inspecting and diagnosing apparatus of claim 1, wherein the temperature sensors are located at a predetermined distance from rear ends of a stage of blades of the gas turbine.

12. An inspecting and diagnosing apparatus for determining inspection locations of a plurality of combustors in a gas turbine, the inspecting and diagnosing apparatus comprising:
a plurality of temperature sensors located to measure temperature at each of plural gas turbine exhaust gas discharge locations in the gas turbine, wherein the temperature sensors are located at a predetermined distance from rear ends of a stage of blades of the gas turbine; and
an inspecting and diagnosing device operatively coupled to receive temperature data from the temperature sensors and that executes an inspection and diagnosis program that calculates a function value for each of the combustors of the gas turbine using a combustion gas flow location temperature index (X), an average combustion gas flow temperature index (Y), a gas turbine swirl angle index (Z), and a gas turbine power output index (MW);
wherein the function values each are based on a difference between the combustion gas flow location temperature index (X) and the average combustion gas flow temperature index (Y), and scaled by the gas turbine swirl angle index (Z);
wherein the inspection and diagnosis program automatically determines that an inspection is required for each combustor that has a function value greater than a gas turbine power output and that no inspection is required for each combustor that has a function value less than the gas turbine power output; and
wherein the inspection and diagnosis program automatically determines an inspection location of the gas turbine upon automatically determining that an inspection is required.

13. The inspecting and diagnosing apparatus of claim 12, wherein the inspecting and diagnosing device calculates the function values using the following equation:
where X represents the combustion gas flow location temperature index, Y represents the average combustion gas flow temperature index, Z represents the gas turbine swirl angle index, and MW represents the gas turbine power index.

14. The inspecting and diagnosing apparatus of claim 12, wherein the gas turbine power output index, which is the power produced from the gas turbine through fuel combustion, is measured at a power production stage of the gas turbine for power generation and corresponds to one of representative quantitative numerical values indicating thermal loads or momentums of combustors to thus be selected as values to be compared with those calculated by the algorithm.

15. The inspecting and diagnosing apparatus of claim 12, wherein the function values each are based on an exponential proportion of the difference between the combustion gas flow location temperature index (X) and the average combustion gas flow temperature index (Y) to the gas turbine power output index (MW), the exponential proportion scaled by the gas turbine swirl angle index (Z).

16. An inspecting and diagnosing apparatus for determining inspection locations of a plurality of combustors in a gas turbine, the inspecting and diagnosing apparatus comprising:
a plurality of temperature sensors located to measure temperature at each of plural gas turbine exhaust gas discharge locations in the gas turbine; and
an inspecting and diagnosing device operatively coupled to receive temperature data from the temperature sensors and that executes an inspection and diagnosis program that calculates a function value for each of the combustors of the gas turbine using a combustion gas flow location temperature index (X), an average combustion gas flow temperature index (Y), a gas turbine swirl angle index (Z), and a gas turbine power output index (MW);
wherein the function values each are based on a difference between the combustion gas flow location temperature index (X) and the average combustion gas flow temperature index (Y), and scaled by the gas turbine swirl angle index (Z);
wherein combustion gas rotation angles are measured for each combustor at a predetermined distance from rear ends of a stage of blades of the gas turbine;
wherein the inspection and diagnosis program automatically determines that an inspection is required for each combustor that has a function value greater than a gas turbine power output and that no inspection is required for each combustor that has a function value less than the gas turbine power output; and
wherein the inspection and diagnosis program automatically determines an inspection location of the gas turbine upon automatically determining that an inspection is required.

17. The inspecting and diagnosing apparatus of claim 16, wherein the inspecting and diagnosing device calculates the function values using the following equation:
where X represents the combustion gas flow location temperature index, Y represents the average combustion gas flow temperature index, Z represents the gas turbine swirl angle index, and MW represents the gas turbine power index.

18. The inspecting and diagnosing apparatus of claim 16, wherein the gas turbine power output index, which is the power produced from the gas turbine through fuel combustion, is measured at a power production stage of the gas turbine for power generation and corresponds to one of representative quantitative numerical values indicating thermal loads or momentums of combustors to thus be selected as values to be compared with those calculated by the algorithm.

19. The inspecting and diagnosing apparatus of claim 16, wherein the function values each are based on an exponential proportion of the difference between the combustion gas flow location temperature index (X) and the average combustion gas flow temperature index (Y) to the gas turbine power output index (MW), the exponential proportion scaled by the gas turbine swirl angle index (Z).

20. The inspecting and diagnosing apparatus of claim 16, wherein the combustion gas flow location temperature index means a combustion gas temperature measured with a corresponding one of the temperature sensors at an exhaust gas discharge location of the gas turbine after the exhaust gas passes through all rotary and stationary blades installed along the combustion gas flow of the gas turbine and is measured at the rear ends of 4-stage blades of the gas turbine.

\* \* \* \* \*